June 24, 1930.  C. S. BRAGG ET AL  1,766,481
POWER ACTUATOR
Original Filed Dec. 12, 1927   2 Sheets-Sheet 1

Inventors
Caleb S. Bragg and
Victor W. Kliesrath
By their Attorney

Patented June 24, 1930

1,766,481

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

POWER ACTUATOR

Application filed December 12, 1927, Serial No. 239,442. Renewed April 9, 1929.

Our invention consists in the novel features hereinafter described, reference being had to the accompanying drawings which show several embodiments of the invention, selected by us for purposes of illustration, and the said invention is fully disclosed in the following description and claims.

Our invention is an improvement in power actuators for use in connection with automotive vehicles and especially adapted for operating the brake mechanism thereof, and it has for its object to provide means whereby the operator is enabled to determine by variations in the resistance to the operator operated part connected with the valve mechanism for controlling the actuator, as for example, by the variations in pressure against his foot, where a pedal lever is employed to actuate the valve mechanism, how much pressure the piston of the actuator is exerting on the brakes or other part to be actuated, and to provide a valve mechanism which will be very sensitive in operation due to a minimum of lost motion and little opening required of the valves which are of greater area than the connecting passages or pipes.

According to our present invention, variations in the differential or fluid pressures on the higher pressure valve operate to increase the initial resistance to the movement of the operator operated part in a direction to effect the power stroke of the actuator and apply the brake mechanism, or actuate the part connected with the piston of the actuator in accordance with the increase of the differential of pressures on the opposite faces of the piston, thereby enabling the operator to determine the amount of power which is exerted by the piston.

Referring to the accompanying drawings.

Figure 1:
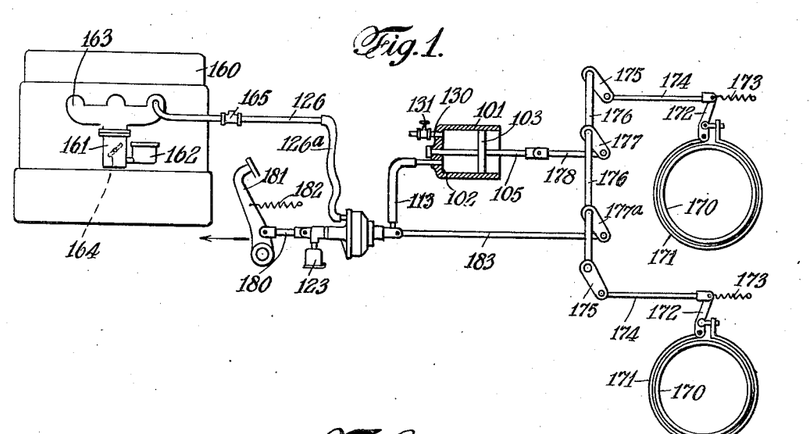
Fig. 1 is a diagrammatic view illustrating an installation in an automatic vehicle, of a power actuator connected with brake mechanism for the vehicle, and operatively connected with the intake manifold of an internal combustion engine for propelling the vehicle, as the source of lower fluid pressure, and embodying our present invention, the valve mechanism being inserted in linkage between the operator operated part and the brake mechanism.
Figure 2:
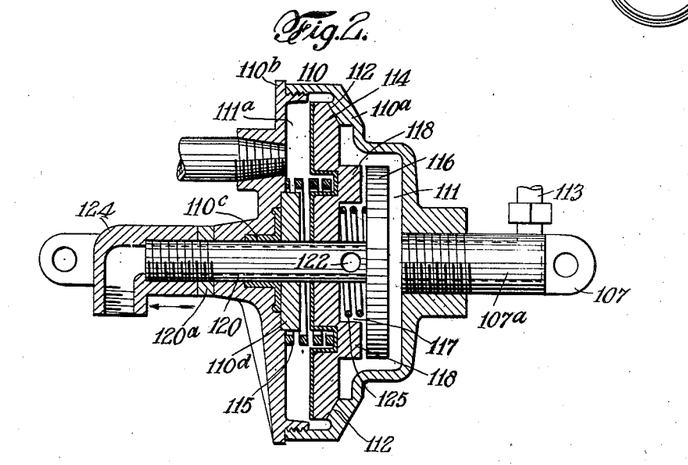
Fig. 2 is an enlarged sectional view of the valve mechanism illustrated in Fig. 1.

In Figs. 1 and 2 of the drawing, we have illustrated an embodiment of our invention, in which the valve mechanism for the actuator is located in linkage between the operator operated part for controlling the valve mechanism, and brake mechanism of the vehicle, to which the piston of the actuator is connected, the valve mechanism being constructed to normally maintain the piston submerged in the higher fluid pressure when the valve mechanism is in the off or released position. The actuator in this instance comprises a cylinder, 101, open at one end and closed at the other by a head, 102, and provided with a piston, 103, movable in the cylinder. In Fig. 1 the power actuator is shown diagrammatically installed in an automotive vehicle, in connection with an internal combustion engine, 160, for propelling the vehicle, which is provided with the usual carburetor, 162, suction passage, 161, including the intake manifold, 163, the suction passage being provided with the usual throttle valve, 164. The actuator cylinder is mounted in the chassis of the vehicle, and the piston is shown provided with a piston rod, 105, which is connected with the part to be actuated, in this instance brake mechanism of the vehicle, indicated diagrammatically in Fig. 1. The brake mechanism may be of any preferred type and operate in connection with two or more wheels of the vehicle. In Fig. 1 it is diagrammatically illustrated as comprising brake drums, 170, brake bands, 171, brake operating levers, 172, and retracting spring, 173, the lever, 172, being connected by links, 174, with arms, 175, on the rock shaft, 176, having an operating arm, 177, connected by link, 178, with the piston rod, 105, of the actuator piston. The operator operated part is in this instance a foot lever, or pedal lever, 181, provided, if desired, with the usual retracting spring, 182, to counterbalance the weight and friction of the operator operated part and is connected by linkage with an arm, 177ª, on the rock shaft, 176, in which linkage the valve mechanism for the actuator is inserted.

In this instance the valve mechanism for the actuator is located exterior to the actuator and comprises the following members. The valve casing, indicated as a whole at 110, is preferably formed in two parts, 110ª and 110ᵇ, which may be screwed together or otherwise connected. Within the valve casing is located a valve seat, 112, which is engaged by a valve, 114, of considerable diameter, which, when seated, divides the casing into two chambers, 111 and 111ª, on opposite sides of the valve. The chamber, 111, which we term the variable pressure chamber, in this instance communicates with the actuator cylinder, 101, by means of a passage, 107ª, in a fitting, 107, secured to the casing member, 110ª, and connected by a flexible pipe, 113, with the cylinder, 101, of the actuator. The valve, 114, which in this instance is the lower pressure or suction valve, is provided on its face adjacent to the chamber, 111, with a recess, 117, surrounded by an annular seat, 118, which is adapted to be engaged by a disc valve, 116, smaller in diameter than the valve, 114, the valve, 116, being in this instance the higher pressure inlet valve, and being provided with a hollow stem, 120, extending through an aperture in the wall of the casing member, 110ᵇ, provided with a sealing member, 110ᶜ, and having its outer end provided with a fitting, 124, having a passage therein communicating with the central passage in the hollow stem, or valve actuating part, 120, which in this instance communicates with the source of higher fluid pressure, i. e., atmosphere or other source of higher fluid pressure, being in this instance provided with an air filter, 123, communicating with the atmosphere. The hollow valve stem, 120, is provided with an aperture, 122, within the recess, 117, which places said recess in communication at all times with the source of higher pressure, and when the valve, 116, is in open position, as shown in Fig. 2, places the chamber, 111, and the cylinder of the actuator forward of the piston in communication with the atmosphere or other higher fluid pressure source. The valve, 116, is provided with a spring, 125, interposed between it and the valve, 114, which normally holds the valve, 116, in open position, the inward movement of the valve, 116, being limited by a collar, 120ª, on the valve stem.

The face of the valve, 114, adjacent to the chamber, 111, is subjected to the fluid pressures within said chamber when the valve, 116, is opened, and when the valve, 116, is closed, the pressure areas of the two valves within the chamber 117, are equalized when the outer face of the valve, 116, becomes a portion of the effective pressure area of the valve, 114. The opposite face of the valve, 114, is at all times subjected to the lower fluid pressure. In this instance the chamber, 111ª, of the valve, which we call the lower pressure or suction chamber, is connected by a suction pipe, 126, a portion of which, 126ª, is flexible, with the suction passage of the engine between the throttle valve, 164, and the engine cylinders, the suction pipe being provided with a check valve, indicated at 165. Yielding resistance means, as a coil spring, 115 (or springs) is interposed between the casing member, 110ᵇ, and the valve, 114, acting thereon in a direction to seat the valve against the maximum differential of pressures exerted on the opposite faces of the valve, and the valve, 114, is made of such size that the spring, 115, will exert a very appreciable resistance to the movement of the valve, 114, in a direction away from its seat when the fluid pressures on opposite faces of the valve, 114, are equalized.

As shown in Fig. 1, the fitting, 124, of the valve actuating sleeve, or stem, 120, is connected by a link, 180, to the operator operated part, while the valve casing itself is connected by a link, 183, with the arm, 177ª, on the rock shaft, of the actuator. The valve casing is also provided with a part, in this instance a hub or washer, 110ᵈ, within the chamber, 111ª, adapted to be engaged by the valve, 114, when in the fully opened position for connecting the operator operated part to the arm, 177ª, and the brake mechanism, when the lost motion was provided between the valve, 114, and the valve casing, is taken up to enable the operator to apply the physical force to the brake mechanism in addition to that of the actuator, or to vent the actuator cylinder and operate the brake mechanism by physical force alone in case of failure of power.

The position of the valves when in off or released position, is illustrated in Fig. 2, the atmospheric or higher fluid pressure valve being open, and thus connecting the cylinder forward of the piston with the atmosphere, and as the rear face of the piston is at all times subjected to atmosphere, fluid pressures on the piston are equalized, and it is maintained normally submerged in the higher fluid pressure, i. e., atmospheric air.

The pressures on opposite faces of the valve, 116, are also equalized. The rear face of the valve, 114, is also subjected to atmospheric pressure and the forward face to suction, and the relation between the pressure of the air on the rear face of the valve, 114, and the power of the resistance spring, 115, on the other face, are so related, that the atmospheric pressure nearly counterbalances the pressure exerted by the resistance spring, 115, when the valve is closed, and its opposite faces are exposed to the maximum differential of fluid pressures, so that the resistance spring, 115, really offers very little resistance under such circumstances to the movement of the valve, 114, away from its seat. A spring, 125, sufficiently strong to overcome the friction of the sealing device, 110, on the valve stem, 120, and to hold the valve, 116, in the open position, may be placed between the valves, 116 and 114, in which case the spring, 115, is made strong enough to overcome the spring, 125, in addition to the differentials of pressures. It will also be seen that the seat, 112, for the valve, 114, forms a stop to limit its closing movement, and that whenever this valve is closed the pressure of the resistance means, 115, is transferred to the valve casing.

When the parts are in normal or released position, as indicated in Fig. 2, and the engine is running, the suction of the suction passage of the engine will exhaust the air from the suction pipe, 126, and from the suction or lower pressure chamber, 111$^a$, of the valve casing, and maintain a state of rarification in said chamber. To effect an operation of the actuator to apply the brakes, the operator will place his foot on the foot pedal and move it forward in the direction of the arrow, Fig. 1, thereby closing the valve, 116, upon its seat, 118, on the rear face of the valve, 114, and disconnecting the closed end of the actuator cylinder from the atmosphere. As soon as valve, 116, is closed by bringing it into contact with the valve, 114, the further forward movement of the pedal will effect the opening of the valve, 114, which requires a very light initial pressure, as the resistance of the spring, 125, is nearly counterbalanced by the atmospheric pressure in the variable pressure chamber, 111, and in the closed end of the cylinder. As soon, however, as the valve, 114, opens, the higher pressure fluid will pass into the suction or lower pressure chamber, 111$^a$, of the valve casing, and thence to the suction passage of the engine, and the differential of fluid pressures on the valve, 114, will be gradually decreased by a decrease of pressure within the variable chamber, 111, and within the closed end of the cylinder, and as the differential of fluid pressure gradually decreases, the pressure of the resistance means, 115, is gradually transferred to the operator operated part, in substantial proportion to said decrease in the differential of fluid pressures on the valve, 114, the valve, 116, at this time being closed and its rear face forming in effect a part of the rear face of the valve, 114. To the resistance of the spring, 115, so applied to the operator operated part, will be added the increase in the differential of fluid pressures on opposite faces of the valve, 116, the inner face of which is at all times subjected to the pressure of the higher pressure fluid, i. e., atmospheric pressure, while the rear face is subjected to the rarification now existing in the chamber, 111, and in the actuator cylinder, so that the differential of fluid pressures on the valve, 116, is added to the resistance of the spring, 115, and applied to the operator operated part in opposition to the forward movement thereof. The maximum braking pressure will be effected when the maximum rarification is obtained in the actuator cylinder forward of the piston (and in the chamber, 111, of the valve casing, connected therewith) and it will thus be seen that the gradually increasing resistance which the operator encounters and which he must overcome in holding the valve, 114, open, and the valve, 116, closed, will enable him to determine accurately the amount of power which the piston of the actuator is exerting in applying the brakes. It will also be seen that the physical force exerted by the operator in overcoming this resistance, as well as the initial resistance offered by the spring, 125, is conserved and transmitted to the brake mechanism in a direction to apply the brakes, and also that the operator, by depressing the foot lever further so as to bring the valve, 114, into contact with the washer or abutment, 110$^d$, can apply his physical force to the brake mechanism in addition to that of the power actuator, and can also apply the brakes by physical force alone in case of failure of power, in which case the first movement of the pedal lever in bringing the valve, 114, into engagement with the washer or abutment, 110$^d$, will close the valve, 116, and open the valve, 114, so as to vent the cylinder.

As soon as the forward movement of the operator's foot and the pedal ceases, the continued forward movement of the piston which is operatively connected with the valve casing, will effect the forward movement of the valve casing with respect to the valve actuating stem, 120, permitting the valve, 114, to close, without opening the valve, 116, cutting off communication between the actuator cylinder forward of its piston, and the suction passage of the engine, and holding the brakes as applied. As soon as the valve, 114, closes, the pressure of the resistance spring, 114, will be transferred from the operator operated part to the valve seat, 112, and the operator's foot is relieved from the necessity of sustaining the pressure of this spring, and has only to sustain the pressure of the springs, 182 and 125. The operator is thus relieved of the greater portion of the pedal pressure in holding the brakes applied for a considerable length of time, as in prolonged or continued braking on a long grade, for example. If the operator wishes to effect a further pressure on the braking surfaces, however, it will be necessary for him to exert sufficient pressure on the pedal to overcome the increased resistance of the spring, 115, and reopen the valve, 114. The pressure of the resistance spring, 115, will become maximum when the rarification in the cylinder forward of the piston equals that in the suction passage of the engine.

The release of the brakes is effected by the operator releasing the pedal lever sufficiently to permit the valve, 116, to be opened by the spring, 182 and 125, admitting atmospheric air to the chamber, 111, and to the cylinder of the actuator forward of the piston, which will permit an immediate release of the brake mechanism under the action of its retracting means. The brakes may be applied and released as often as desired, by moving the foot lever forward so as to open the valve, 114, and then releasing it sufficiently to seat the valve, 114, and open the valve, 116. To release the brakes entirely the operator will remove his foot from the brake lever, or release it from pressure, permitting the valve, 114, to seat, the valve, 116, to open, and admitting air to the cylinder of the actuator forward of the piston, and permitting the brakes to release themselves and the piston and brake mechanism to be returned to their original positions by the retracting means of the brake mechanisms, as the spring, 173.

It will be seen that by our invention the operator is enabled to determine very accurately the amount of power which is being applied to the brake mechanism by the actuator, by the variations in the resistance to the operator operated part for actuating the valve mechanism in substantially the same manner as when operating ordinary hand or foot operated brake mechanisms, while the brakes are actually applied by the power of the actuator, and as before stated, the operator is relieved from the greater part of this increased resistance, that is to say, the resistance of the spring, 115, by the seating of the valve, 114.

By reason of the fact that the force exerted by the operator in operating the valve mechanism in opposition to the springs, 115 and 125, is conserved and applied to the piston in the direction of its power stroke, the cylinder and piston of small size and less weight may be employed to do the same work as a larger and heavier cylinder and piston with economy of manufacture and convenience in installation, and correspondingly smaller quantities of air will be withdrawn into the suction passage of the engine with each application of the brake mechanism with less liability of interfering with the operation of the engine or stalling it if idling.

It will be obvious that more than one actuator may be controlled by the valve mechanism, by connecting the cylinder, 101, with another cylinder or cylinders, by suitable pipe connections between the corresponding parts of the several cylinders. For example, in Fig. 1, the cylinder, 101, is shown provided at its closed end with a pipe, 130, for connecting it with the corresponding portion of one or more cylinders having pistons therein, which may be connected with other brake mechanisms, or the same brake mechanism, so that the pistons of all the connected cylinders will be operated simultaneously under the control of the single valve mechanism shown. The pipe, 130, is shown provided with a cut off cock, 131, so that it may be closed when no other cylinder is connected therewith. It is also obvious that our invention is applicable in connection with any type of power actuator which comprises relatively movable coacting members, at least one of which is connected with a part to be operated, and with the casing of the valve mechanism.

While we have shown, in Figs. 1 and 2, the valve mechanism located entirely apart from the actuator, in linkage between the operator operated part and the brake mechanism connected with the actuator piston, the valve mechanism may be directly connected to the piston itself, either within or exterior to the actuator cylinder. For example, in Figs. 3 and 4, we have shown an arrangement in which the valve mechanism is located outside of the actuator cylinder, but is directly connected to the actuator piston, being supported upon an exterior portion of a hollow piston rod thereof. In these figures, in which the parts corresponding to those previously described are given the same reference numerals with the addition of 100 to avoid repetition, the valve casing, 210, has the portion, 210$^a$, provided with a threaded aperture, 208, which is screwed upon or otherwise secured to a hollow piston rod, 205, connected with the piston, 203, in the actuator cylinder, 201, and provided within the cylinder, adjacent to the piston, with an aperture, 205$^a$, for connecting the chamber, 211, of the valve casing with the interior of the cylinder forward of the piston. The valve stem fitting, 224, is connected to the operator operated part, and the piston is connected to the brake mechanism, as before described. The head, 202, of the cylinder is provided with a stuffing box, or sealing member, as indicated at 202ª, in Fig. 3.

Figures 3, 5:
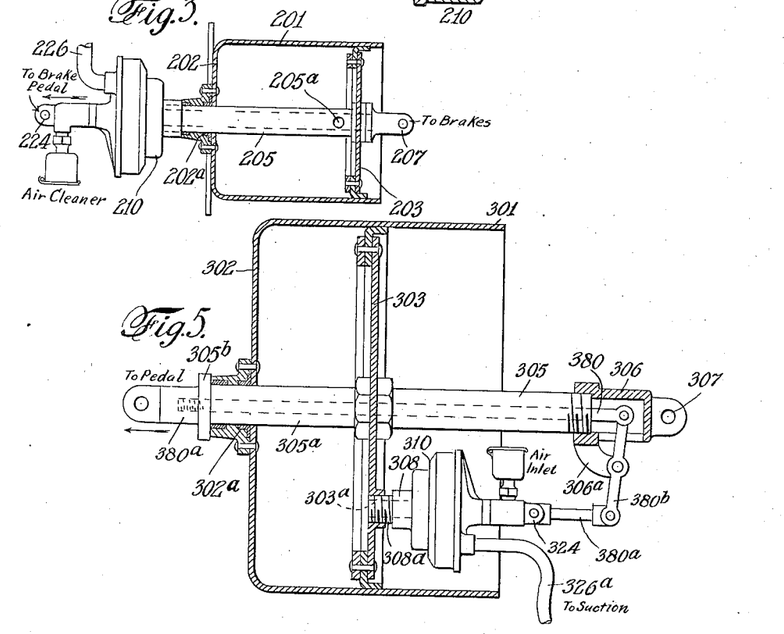
Fig. 3 is a detail view illustrating a modification, in which the valve mechanism is carried by and operated by a piston rod connected with the piston of the actuator.
Fig. 5 represents a further modification, in which the valve mechanism is directly connected with and carried by the piston of the actuator.
Figure 4:
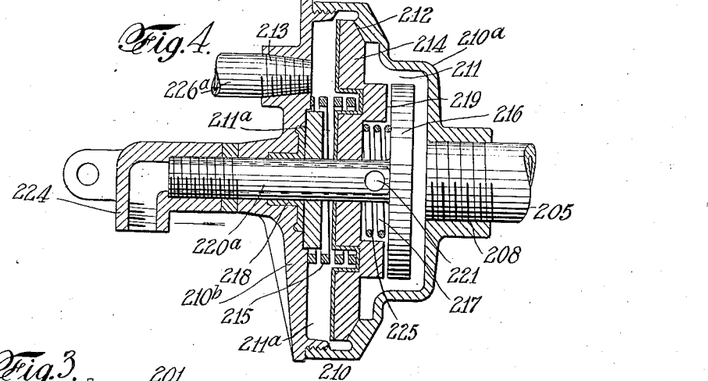
Fig. 4 is an enlarged sectional view of the valve mechanism illustrated in Fig. 3.

The operation of this embodiment of our invention will be exactly the same as that previously described, except that the physical power of the operator will be transmitted to the brake mechanism through the piston.

In Fig. 5 we have shown still another modification of our invention, in which the valve mechanism is attached to the piston independently of the piston rod. In this figure the parts corresponding to those shown in Figs. 1 and 2, and previously described are given the same reference characters, with the addition of 200, to avoid repetition. In this case the piston is provided with a hollow piston rod, 305, a portion, 305ª, of which extends through the forward head of the cylinder, which is provided with a stuffing box or other sealing means, indicated at 302ª, and with a collar, 305ᵇ, for limiting the rearward movement of the piston. The valve mechanism, indicated as a whole at 310, is constructed substantially as shown in Fig. 4, the aperture in the hub, 308, being connected in this instance by a short nipple, 308ª, which is screwed into an aperture, 303ª, in the piston, so as to place the valve chamber in communication with the cylinder forward of the piston, the connections from the valve casing to the suction pipe and atmosphere being exactly the same as indicated in Fig. 4, although the position of the valve mechanism is reversed. In this construction the fitting, 324, on the end of the valve stem is connected by a link, 380ª, with one end of a lever, 380ᵇ, pivoted to a lug, 306ª, on the fitting, 306, carried by the piston rod, 305, the other end of the lever, 380ᵇ, which extends within the fitting, 306, being connected by a rod or link, 380, extending through the hollow piston rod and provided at its forward end with a fitting, 380ᶜ, which is connected in the usual manner with the pedal lever. In this instance the valve mechanism is directly connected with the piston and moves therewith, the operation being exactly the same as that hereinbefore described.

In this embodiment of the invention, the wall of the cylinder, 301, may be extended rearwardly beyond the position of the piston in its retracted or released position, so that the valve casing is contained within the cylinder wall and afforded a certain amount of protection against injury.

What we claim and desire to secure by Letters Patent is:—

1. Valve mechanism for controlling the operation of fluid pressure actuators, comprising among its members a valve casing provided with a valve seat within the same, a lower pressure valve of relatively large diameter for engaging said seat and dividing said casing into a lower pressure chamber and a variable pressure chamber, said casing being provided with means for connecting the lower pressure chamber with a source of lower fluid pressure and for connecting the variable pressure chamber to a portion of the actuator to be controlled, the face of said valve adjacent to the variable pressure chamber being provided with a valve seat and a recess within the same and having its opposite face exposed at all times to the lower fluid pressure, yielding resistance means interposed between said valve and the casing and having sufficient power to seat said valve against the maximum differential of fluid pressures on its opposite faces and being nearly counterbalanced by the maximum differential of fluid pressures, said resistance means being capable of offering material resistance to the movement of said valve in a direction away from its seat when the fluid pressures on opposite faces of the said valve are equalized, a higher pressure inlet valve in said variable pressure chamber adapted to engage said seat on the lower pressure valve, means for connecting said higher pressure valve with an operator operated part for effecting the opening of one valve after the seating of the other by a movement in either direction, means for connecting said recess with a source of higher fluid pressure, thereby subjecting the adjacent face of the higher pressure valve at all times to the higher fluid pressure in a direction to open it, and yielding means for normally maintaining the higher pressure valve in open position when the fluid pressures on opposite faces thereof are equalized.

2. In a power actuator, the combination of a cylinder closed at one end, a piston therein provided with means for connecting it with a part to be operated, and controlling valve mechanism comprising a valve casing provided with a valve seat within the same, a lower pressure valve of relatively large diameter for engaging said seat and dividing said casing into a lower pressure chamber, said casing being provided with means for connecting the lower pressure chamber with a source of lower fluid pressure, means for connecting the variable pressure chamber with the portion of the actuator cylinder between the piston and the closed end thereof, the face of said valve adjacent to the variable pressure chamber being provided with a valve seat and a recess within the same, and having its opposite face exposed at all times to the lower fluid pressure, yielding resistance means in said lower pressure chamber interposed between said valve and the casing, and having sufficient power to seat said valve against the maximum differential of fluid pressures on its opposite faces, said resistance means being nearly counterbalanced by said maximum differential of fluid pressures, and being capable of offering material resistance to the movement of said valve in a direction away from its seat when the differential of fluid pressures on the opposite faces of said valve are equalized, a higher pressure inlet valve in said variable pressure chamber adapted to engage said seat on the lower pressure valve, an operator operated part connected with said higher pressure valve for effecting the opening of one valve after the seating of the other by a movement in either direction, means for connecting said recess between said valve with a source of higher fluid pressure, thereby subjecting the adjacent face of the higher pressure valve at all times to said higher fluid pressure, in a direction to open it, and yielding means for normally maintaining the higher pressure valve in open position when the fluid pressures on opposite faces thereof are equalized.

3. In a power actuator, the combination of a cylinder closed at one end, a piston therein provided with means for connecting it with a part to be operated, and controlling valve mechanism comprising a valve casing provided with a valve seat within the same, a lower pressure valve of relatively large diameter for engaging said seat and dividing said casing into a lower pressure chamber, said casing being provided with means for connecting the lower pressure chamber with a source of lower fluid pressure, means for connecting the variable pressure chamber with the portion of the actuator cylinder between the piston and the closed end thereof, the face of said valve adjacent to the variable pressure chamber being provided with a valve seat and a recess within the same, and having its opposite face exposed at all times to the lower fluid pressure, yielding resistance means in said lower pressure chamber interposed between said valve and the casing, and having sufficient power to seat said valve against the maximum differential of fluid pressures on its opposite faces, said resistance means being nearly counterbalanced by said maximum differential of fluid pressures, and being capable of offering material resistance to the movement of said valve in a direction away from its seat when the differential of fluid pressures on the opposite faces of said valve are equalized, a higher pressure inlet valve in said variable pressure chamber adapted to engage said seat on the lower pressure valve, an operator operated part connected with said higher pressure valve for effecting the opening of one valve after the seating of the other by a movement in either direction, means for connecting said recess between said valve with a source of higher fluid pressure, thereby subjecting the adjacent face of the higher pressure valve at all times to said higher pressure fluid, in a direction to open it, and yielding means for normally maintaining the higher pressure valve in open position when the fluid pressures on opposite faces thereof are equalized, and means for connecting the valve casing with the actuator piston and the part to be operated thereby, the movement of the valves in a direction to close the higher pressure valve and open the lower pressure valve to effect the power stroke of the piston being in the same direction as the piston stroke, whereby the force exerted by the operator in overcoming the initial resistance of said movements of said valve and the additional resistance transferred thereto by variations in the differentials of fluid pressures on said valve will be conserved and transmitted to the part to be operated.

4. In a power actuator, the combination of a cylinder closed at one end, a piston thereon provided with means for connecting it with a part to be operated, and controlling valve mechanism comprising a valve casing provided with a valve seat within the same, a lower pressure valve of relatively large diameter for engaging said seat and dividing said casing into a lower pressure chamber, said casing being provided with means for connecting the lower pressure chamber with a source of lower fluid pressure, means for connecting the variable pressure chamber with the portion of the actuator cylinder between the piston and the closed end thereof, the face of said valve adjacent to the variable pressure chamber being provided with a valve seat and a recess within the same, and having its opposite face exposed at all times to the lower fluid pressure, yielding resistance means in said lower pressure chamber interposed between said valve and the casing, and having sufficient power to seat said valve against the maximum differential of fluid pressures on its opposite faces, said resistance means being nearly counterbalanced by said maximum differential of fluid pressures, and being capable of offering material resistance to the movement of said valve in a direction away from its seat when the differential of fluid pressures on the opposite faces of said valve are equalized, a higher pressure inlet valve in said variable pressure chamber adapted to engage said seat on the lower pressure valve, an operator operated part connected with said higher pressure valve for effecting the opening of one valve after the seating of the other by a movement in either direction, means for connecting said recess between said valve with a source of higher fluid pressure, thereby subjecting the adjacent face of the higher pressure valve at all times to said higher pressure fluid, in a direction to open it, and yielding means for normally maintaining the higher pressure valve in open position when the fluid pressures on opposite faces thereof are equalized, and means for limiting the relative movement between said valves and the valve casing to enable the operator to apply his physical force to the part to be operated in addition to any power exerted by the actuator and in case of failure of power to vent the cylinder and apply the brakes by physical force alone.

5. In brake mechanism for an automotive vehicle provided with an internal combustion engine having a carburetor, a suction passage therefrom to the engine cylinders, and a throttle valve for said passage, the combination of a power actuator comprising a cylinder closed at one end, a piston therein operatively connected with brake mechanism of the vehicle, controlling valve mechanism comprising a casing having a valve seat within the same, a suction valve of relatively large diameter for engaging said seat and dividing the casing into a suction chamber, and a variable pressure chamber, means for connecting said suction chamber with the suction passage of the engine between the throttle valve and the engine cylinders, means for connecting said variable pressure chamber with the cylinder of the actuator between the piston and the closed end of the cylinder, the face of said suction valve adjacent to the variable pressure chamber being provided with a valve seat and a recess within the same, and having its opposite face exposed at all times to the suction in said suction chamber, yielding resistance means interposed between said valve and the casing, for seating said valve against the maximum differential of fluid pressures on its opposite faces, said resistance means being of sufficient power to offer material resistance to the movement of said valve in a direction away from its seat when the fluid pressures on opposite faces of said valve are equalized and being nearly counterbalanced by the maximum differential of fluid pressures on said valve, a higher pressure inlet valve in said variable pressure chamber adapted to engage said seat on the suction valve, means for connecting said recess between said valves with the source of higher fluid pressure, and thereby subjecting the adjacent face of the higher pressure valve at all times to the higher fluid pressure in a direction to open it, and yielding means for normally maintaining the higher pressure valve in open position when the fluid pressures on opposite faces thereof are equalized, an operator operated part, and connections therefrom to the higher pressure valve for effecting the opening of one valve after the closing of the other by a movement in either direction.

6. In brake mechanism for an automotive vehicle provided with an internal combustion engine having a carburetor, a suction passage therefrom to the engine cylinders, and a throttle valve for said passage, the combination of a power actuator comprising a cylinder closed at one end, a piston therein operatively connected with brake mechanism of the vehicle, controlling valve mechanism comprising a casing having a valve seat within the same, a suction valve of relatively large diameter for engaging said seat and dividing the casing into a suction chamber, and a variable pressure chamber, means for connecting said suction chamber with the suction passage of the engine between the throttle valve and the engine cylinders, means for connecting said variable pressure chamber with the cylinder of the actuator between the piston and the closed end of the cylinder, the face of said suction valve adjacent to the variable pressure chamber being provided with a valve seat and a recess within the same, and having its opposite face exposed at all times to the suction in said suction chamber, yielding resistance means interposed between said valve and the casing, for seating said valve against the maximum differential of fluid pressures on its opposite faces, said resistance means being of sufficient power to offer material resistance to the movement of said valve in a direction away from its seat when the fluid pressures on opposite faces of said valve are equalized and being nearly counterbalanced by the maximum differential of fluid pressures on said valve, a higher pressure inlet valve in said variable pressure chamber adapted to engage said seat on the suction valve, means for connecting said recess between said valves with the source of higher fluid pressure, and thereby subjecting the adjacent face of the higher pressure valve at all times to the higher fluid pressure in a direction to open it, and yielding means for normally maintaining the higher pressure valve in open position when the fluid pressures on opposite faces thereof are equalized, an operator operated part, and connections therefrom to the higher pressure valve for effecting the opening of one valve after the closing of the other by a movement in either direction, means for connecting the valve casing with the brake mechanism operated by said piston, the direction of movement of said valves to effect the power stroke of the piston being the same as the direction of said power stroke, whereby the physical force exerted by the operator to overcome the initial resistance to the movement of said valves and the additional resistance transferred to the operator operated part by the variations in the differentials of fluid pressures, on said valves, will be conserved and transmitted to the brake mechanisms.

7. In brake mechanism for an automotive vehicle provided with an internal combusion engine having a carburetor, a suction passage therefrom to the engine cylinders, and a throttle valve for said passage, the combination of a power actuator comprising a cylinder closed at one end, a piston therein operatively connected with brake mechanism of the vehicle, controlling valve mechanism comprising a casing having a valve seat within the same, a suction valve of relatively large diameter for engaging said seat and dividing the casing into a suction chamber, and a variable pressure chamber, means for connecting said suction chamber with the suction passage of the engine between the throttle valve and the engine cylinders, means for connecting said variable pressure chamber with the cylinder of the actuator between the piston and the closed end of the cylinder, the face of said suction valve adjacent to the variable pressure chamber being provided with a valve seat and a recess within the same, and having its opposite face exposed at all times to the suction in said suction chamber, yielding resistance means interposed between said valve and the casing for seating said valve against the maximum differential of fluid pressures on its opposite faces, said resistance means being of sufficient power to offer material resistance to the movement of said valve in a direction away from its seat when the fluid pressures on opposite faces of said valve are equalized and being nearly counterbalanced by the maximum differential of fluid pressures on said valve, a higher pressure inlet valve in said variable pressure chamber adapted to engage said seat on the suction valve, means for connecting said recess between said valves with the source of higher fluid pressure, and thereby subjecting the adjacent face of the higher pressure valve at all times to the higher fluid pressure in a direction to open it, and yielding means for normally maintaining the higher pressure valve in open position when the fluid pressures on opposite faces thereof are equalized, an operator operated part, and connections therefrom to the higher pressure valve for effecting the opening of one valve after the closing of the other by a movement in either direction, said valve casing being operatively connected with brake mechanisms operated by the piston of the actuator, and means for limiting the relative movement between said valves and casing to enable the operator to apply his physical force to the brake mechanism in addition to that exerted by the actuator to and to operate the valve mechanism to vent the cylinder and apply the brake mechanisms by his physical force in case of failure of power.

8. In brake mechanism for an automotive vehicle provided with an internal combustion engine having a carburetor, a suction passage therefrom to the engine cylinders, and a throttle valve for said passage, the combination of a power actuator comprising a cylinder closed at one end, a piston therein operatively connected with brake mechanism of the vehicle, controlling valve mechanism comprising a casing having a valve seat within the same, a suction valve of relatively large diameter for engaging said seat and dividing the casing into a suction chamber, and a variable pressure chamber, means for connecting said suction chamber with the suction passage of the engine between the throttle valve and the engine cylinders, means for connecting said variable pressure chamber with the cylinder of the actuator between the piston and the closed end of the cylinder, the face of said suction valve adjacent to the variable pressure chamber being provided with a valve seat and a recess within the same, and having its opposite face exposed at all times to the suction in said suction chamber, yielding resistance means interposed between said valve and the casing for seating said valve against the maximum differential of fluid pressures on its opposite faces, said resistance means being of sufficient power to offer material resistance to the movement of said valve in a direction away from its seat when the fluid pressures on opposite faces of said valve are equalized and being nearly counterbalanced by the maximum differential of fluid pressures on said valve, a higher pressure inlet valve in said variable pressure chamber adapted to engage said seat on the suction valve, means for connecting said recess between said valves with the source of higher fluid pressure, and thereby subjecting the adjacent face of the higher pressure valve at all times to the higher fluid pressure in a direction to open it, and yielding means for normally maintaining the higher pressure valve in open position when the fluid pressures on opposite faces thereof are equalized, an operator operated part, and connections therefrom to the higher pressure valve for effecting the opening of one valve after the closing of the other by a movement in either direction, said valve casing being connected to and movable with the piston of the actuator.

9. In brake mechanism for an automotive vehicle provided with an internal combustion engine having a carburetor, a suction passage therefrom to the engine cylinders, and a throttle valve for said passage, the combination of a power actuator comprising a cylinder closed at one end, a piston therein operatively connected with brake mechanism of the vehicle, controlling valve mechanism comprising a casing having a valve seat within the same, a suction valve of relatively large diameter for engaging said seat and dividing the casing into a suction chamber, and a variable pressure chamber, means for connecting said suction chamber with the suction passage of the engine between the throttle valve and the engine cylinders, means for connecting said variable pressure chamber with the cylinder of the actuator between the piston and the closed end of the cylinder, the face of said suction valve adjacent to the variable pressure chamber being provided with a face exposed at all times to the suction in said suction chamber, yielding resistance means interposed between said valve and the casing for seating said valve against the maximum differential of fluid pressures on its opposite faces, said resistance means being of sufficient power to offer material resistance to the movement of said valve in a direction away from its seat when the fluid pressures on opposite faces of said valve are equalized and being nearly counterbalanced by the maximum differential of fluid pressures on said valve, a higher pressure inlet valve in said variable pressure chamber adapted to engage said seat on the suction valve, means for connecting said recess between said valves with the source of higher fluid pressure, and thereby subjecting the adjacent face of the higher pressure valve at all times to the higher fluid pressure in a direction to open it, and yielding means for normally maintaining the higher pressure valve in open position when the fluid pressures on opposite faces thereof are equalized, an operator operated part, and connections therefrom to the higher pressure valve for effecting the opening of one valve after the closing of the other by a movement in either direction, said valve casing being connected to and movable with the piston of the actuator, and means for limiting the relative movement between said valves and the valve casing to enable the operator to apply his physical force to the piston and brake mechanisms connected therewith in addition to the power exerted by the actuator and to operate said valves to vent the cylinder and operate said brake mechanisms by physical force alone in case of failure of power.

10. In brake mechanism for automotive vehicles provided with an internal combustion engine having a carburetor, a suction passage therefrom to the engine cylinders, and a throttle valve for said passage, the combination of a power actuator comprising a cylinder closed at one end, a piston in said cylinder provided with means for connecting it with brake mechanism of the vehicle, and controlling valve mechanism, said valve mechanism comprising a valve casing having an annular seat within the same, a suction valve for engaging said seat, and dividing the casing into a suction chamber and a variable pressure chamber, means for connecting said suction chamber with the suction passage of the engine between the throttle valve and the engine cylinders, means for connecting said variable pressure chamber with the cylinder of the actuator between the piston and the closed end of the cylinder said suction valve having its face adjacent to the variable pressure chamber provided with an annular valve seat and a recess within said seat, and having its opposite face exposed at all times to the suction in said suction chamber, variable resistance means in said suction chamber interposed between said valve and the casing and having sufficient power to seat said valve against the maximum differential of fluid pressures on its opposite faces and to offer material resistance to the movement of said valve in a direction away from its seat when the fluid pressures on its opposite faces are equalized and being nearly counterbalanced by the maximum differential of fluid pressures on the opposite faces of said valve, an air inlet valve in said variable pressure chamber for engaging the valve seat on said suction valve, said air inlet valve being of smaller diameter than the suction valve, a hollow valve stem connected with said air inlet valve extending to the exterior of said valve casing and provided with an air inlet aperture, said stem having an aperture for establishing communication between said air inlet and the said recess between said valves, yielding means for holding said air inlet valve in open position when the valve mechanism is in its released position, and an operator operated part connected with said valve stem.

11. In brake mechanism for automotive vehicles provided with an internal combustion engine having a carburetor, a suction passage therefrom to the engine cylinders, and a throttle valve for said passage, the combination of a power actuator comprising a cylinder closed at one end, a piston in said cylinder provided with means for connecting it with brake mechanism of the vehicle, and controlling valve mechanism, said valve mechanism comprising a valve casing having an annular seat within the same, a suction valve for engaging said seat, and dividing the casing into a suction chamber and a variable pressure chamber, means for connecting said suction chamber with the suction passage of the engine between the throttle valve and the engine cylinders, means for connecting said variable pressure chamber with the cylinder of the actuator between the piston and the closed end of the cylinder, said suction valve having its face adjacent to the variable pressure chamber provided with an annular valve seat and a recess within said seat, and having its opposite face exposed at all times to the suction in said suction chamber, variable resistance means in said suction chamber interposed between said valve and the casing and having sufficient power to seat said valve against the maximum differential of fluid pressures on its opposite faces and to offer material resistance to the movement of said valve in a direction away from its seat when the fluid pressures on its opposite faces are equalized and being nearly counterbalanced by the maximum differential of fluid pressures on the opposite faces of said valve, an air inlet valve in said variable pressure chamber for engaging the valve seat on said suction valve, said air inlet valve being of smaller diameter than the suction valve, a hollow valve stem connected with said air inlet valve extending to the exterior of said valve casing and provided with an air inlet aperture, said stem having an aperture for establishing communication between said air inlet and the said recess between said valves, yielding means for holding said air inlet valve in open position when the valve mechanism is in its released position, and an operator operated part connected with said valve stem, said valve casing being operatively connected with the piston of the actuator and said casing being provided with a part adapted to be engaged by said suction valve for limiting its movement in a direction to open it to enable the operator to apply his physical force to the piston, and the brake mechanism connected therewith, in addition to the power exerted by the actuator, and to move said valves to vent the cylinder and operate said brake mechanism by physical force in case of failure of power.

12. In valve mechanism for power actuators, the combination with a valve casing, a lower pressure valve dividing it into two compartments, one connected at all times with the lower pressure source, and the other with the actuator, means for connecting the latter compartment with the higher pressure source to expose one face of said valve to the higher pressure fluid in a direction to open said valve, a resistance spring interposed between said valve and the casing for overcoming the said higher pressure fluid, and holding the valve seated, a higher pressure valve for closing the communication between said latter compartment and the higher pressure source, and constructed to engage the lower pressure valve in a direction to unseat the latter, and means for connecting the higher pressure valve and said casing respectively to an operator operated part and to the actuator piston or part to be operated thereby.

13. In valve mechanism for power actuators, the combination with a valve casing, a lower pressure valve dividing it into two compartments, one connected at all times with the lower pressure source, and the other connected with the actuator, said valve being provided with a seat on the face within said latter compartment, means for connecting the space within said seat with a source of higher pressure, a higher pressure valve within said latter compartment adapted to engage said seat and disconnect the actuator from the higher pressure source, a resistance spring interposed between the said lower pressure valve and said casing constructed to hold said valve closed against the higher fluid pressure within the valve casing and actuator when the higher pressure valve is in open position, means for connecting the higher pressure valve and the valve casing respectively to an operator operated part and to the actuator piston or part to be operated thereby, to enable the higher pressure valve to be brought into engagement with its seat and thereafter unseat the lower pressure valve, and yielding means normally holding the higher pressure valve in open position.

In testimony whereof we affix our signatures.

CALEB S. BRAGG.
VICTOR W. KLIESRATH.